(12) United States Patent
Madnani et al.

(10) Patent No.: US 9,063,895 B1
(45) Date of Patent: *Jun. 23, 2015

(54) SYSTEM AND METHOD OF NON-DISRUPTIVE DATA MIGRATION BETWEEN HETEROGENEOUS STORAGE ARRAYS

(75) Inventors: Kiran Madnani, Framingham, MA (US); Adi Ofer, Sunnyvale, CA (US); Jeffrey A. Brown, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 2055 days.

This patent is subject to a terminal disclaimer.

(21) Appl. No.: 11/771,655

(22) Filed: Jun. 29, 2007

(51) Int. Cl.
*G06F 12/00* (2006.01)
*G06F 11/14* (2006.01)
*G06F 3/06* (2006.01)
*H04L 29/08* (2006.01)

(52) U.S. Cl.
CPC .......... *G06F 11/1466* (2013.01); *G06F 3/0604* (2013.01); *G06F 3/0647* (2013.01); *G06F 3/0685* (2013.01); *H04L 67/1095* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 5,247,632 A | 9/1993 | Newman | |
| 6,363,462 B1 | 3/2002 | Bergsten | |
| 6,421,711 B1 | 7/2002 | Blumenau et al. | |
| 6,477,632 B1 | 11/2002 | Kikuchi | |
| 6,598,174 B1 | 7/2003 | Parks et al. | |
| 6,714,952 B2 | 3/2004 | Dunham et al. | |
| 6,839,750 B1 | 1/2005 | Bauer et al. | |
| 7,051,101 B1 | 5/2006 | Dubrovsky et al. | |
| 7,124,143 B2 | 10/2006 | Matsunami et al. | |
| 7,219,092 B2 | 5/2007 | Ikegaya et al. | |
| 7,334,029 B2 | 2/2008 | Shiga et al. | |
| 7,398,421 B1 * | 7/2008 | Limaye et al. | 714/18 |
| 2003/0131182 A1 | 7/2003 | Kumar et al. | |
| 2003/0188218 A1 | 10/2003 | Lubbers et al. | |

(Continued)

FOREIGN PATENT DOCUMENTS

EP 1130514 A2 9/2001

OTHER PUBLICATIONS

Madnani, et al.; U.S. Appl. No. 11/771,604, filed Jun. 29, 2007; 52 pages.

(Continued)

*Primary Examiner* — Daniel Bernard
(74) *Attorney, Agent, or Firm* — Schmeiser, Olsen & Watts LLP; Michael A. Rodriguez

(57) ABSTRACT

Described is non-disruptive data migration from a source array to a heterogeneous destination array. A name server database is queried to obtain port names for each source array port. The source array is queried to obtain information about each source array LUN. A target array is generated at the destination array for receiving a copy of data resident at the source array. The target array has at least as many ports and at least as many LUNs as the source array. Each source array LUN corresponds to a target array LUN and is equal in storage capacity as that corresponding LUN. All data resident in the source array LUNs are copied to corresponding target array LUNs. The name server database is reconfigured to associate source port names with the port addresses of the target array such that the target array appears to a host as the source array.

27 Claims, 11 Drawing Sheets

(56) References Cited

U.S. PATENT DOCUMENTS

| | | | |
|---|---|---|---|
| 2004/0024964 | A1 | 2/2004 | Taninaka et al. |
| 2004/0054618 | A1 | 3/2004 | Chang et al. |
| 2004/0139240 | A1* | 7/2004 | DiCorpo et al. ............ 710/3 |
| 2004/0151188 | A1 | 8/2004 | Mavelli et al. |
| 2004/0250021 | A1 | 12/2004 | Honda et al. |
| 2005/0010688 | A1 | 1/2005 | Murakami et al. |
| 2005/0108476 | A1 | 5/2005 | Tanaka et al. |
| 2005/0193168 | A1 | 9/2005 | Eguchi et al. |
| 2005/0243611 | A1* | 11/2005 | Lubbers et al. ........ 365/189.05 |
| 2005/0251620 | A1 | 11/2005 | Matsunami et al. |
| 2006/0041595 | A1* | 2/2006 | Taguchi et al. ............. 707/200 |
| 2006/0047930 | A1 | 3/2006 | Takahashi et al. |
| 2006/0064466 | A1 | 3/2006 | Shiga et al. |
| 2006/0072580 | A1 | 4/2006 | Dropps et al. |
| 2006/0085607 | A1 | 4/2006 | Haruma |
| 2006/0107010 | A1 | 5/2006 | Hirezaki |
| 2006/0129772 | A1 | 6/2006 | Kawamura et al. |
| 2006/0168415 | A1 | 7/2006 | Ishii et al. |
| 2006/0182050 | A1 | 8/2006 | Dohm |
| 2006/0242377 | A1 | 10/2006 | Kanie et al. |
| 2007/0220310 | A1* | 9/2007 | Sharma et al. .................. 714/6 |
| 2007/0266212 | A1* | 11/2007 | Uchikado et al. ............ 711/162 |
| 2007/0291785 | A1* | 12/2007 | Sharma et al. ............. 370/464 |
| 2008/0086608 | A1* | 4/2008 | Kano ........................... 711/162 |
| 2008/0189700 | A1 | 8/2008 | Schmidt et al. |

OTHER PUBLICATIONS

Madnani, et al.; U.S. Appl. No. 11/771,686, filed Jun. 29, 2007; 53 pages.
Madnani; U.S. Appl. No. 11/241,165, filed Sep. 30, 2005; 49 pages.
Madnani, et al.; U.S. Appl. No. 11/318,756, filed Dec. 27, 2005; 77 pages.
Ofer, et al.; U.S. Appl. No. 11/427,664, filed Jun. 29, 2006; 76 pages.
Madnani, et al.; U.S. Appl. No. 11/427,677, filed Jun. 29, 2006; 75 pages.
Madnani, et al.; U.S. Appl. No. 11/427,685, filed Jun. 29, 2006; 74 pages.
Ofer, et al.; U.S. Appl. No. 11/427,699, filed Jun. 29, 2006; 79 pages.
Office Action mailed Aug. 19, 2008 for U.S. Appl. No. 11/241,165.
Office Action mailed Sep. 30, 2008 for U.S. Appl. No. 11/318,756.
Office Action mailed Feb. 23, 2009 for U.S. Appl. No. 11/427,664.
Notice of Allowance mailed Sep. 19, 2008 for U.S. Appl. No. 11/427,677.
Notice of Allowance mailed Sep. 24, 2008 for U.S. Appl. No. 11/427,685.
Notice of Allowance mailed Sep. 29, 2008 for U.S. Appl. No. 11/427,699.
Office Action mailed Jul. 20, 2009 for U.S. Appl. No. 11/241,165.
Office Action mailed Jun. 18, 2009 for U.S. Appl. No. 11/318,756.
Final Office Action mailed Mar. 2, 2010 for U.S. Appl. No. 11/241,165.
Final Office Action mailed Dec. 15, 2009 for U.S. Appl. No. 11/318,756.
Final Office Action mailed Nov. 9, 2009 for U.S. Appl. No. 11/427,664.
Office Action mailed Oct. 2, 2009 for U.S. Appl. No. 11/771,604.
Office Action mailed Dec. 23, 2010 for U.S. Appl. No. 11/241,165.
Office Action mailed Dec. 8, 2010 for U.S. Appl. No. 11/318,756.
Office Action mailed Apr. 15, 2011 for U.S. Appl. No. 11/318,756, 7 pages.
Notice of Allowance in related U.S. Appl. No. 11/427,664, mailed on May 30, 2013; 14 pages.
Office Action mailed Sep. 18, 2012 for U.S. Appl. No. 11/427,664, 18 pgs.

* cited by examiner

FIG. 3 — Table 32

| PORT NAME | PORT ID | VIRTUAL PORT NAME | VIRTUAL PORT ID |
|---|---|---|---|
| A | 0 | n/a | n/a |
| B | 1 | n/a | n/a |

FIG. 6 — Table 32

| PORT NAME | PORT ID | VIRTUAL PORT NAME | VIRTUAL PORT ID |
|---|---|---|---|
| A | 2 | vn0 | v0 |
| A | 2 | vn2 | v2 |
| B | 3 | vn1 | v1 |
| E | 4 | vn3 | v3 |

FIG. 4 — Table 44

| LUN NAME | PORT ID | LUN # |
|---|---|---|
| m | 0 | 40 |
| n | 0 | 41 |
| p | 0 | 42 |
| q | 1 | 50 |
| r | 1 | 51 |
| s | 1 | 52 |

FIG. 7 — Table 44

| LUN NAME | PORT ID | LUN # |
|---|---|---|
| m | v0 | 40 |
| n | v0 | 41 |
| p | v0 | 42 |
| q | v1 | 50 |
| r | v1 | 51 |
| s | v1 | 52 |
| m | v2 | 40 |
| n | v2 | 41 |
| p | v2 | 42 |
| g0 | v3 | L20 |
| h0 | v3 | L21 |
| j0 | v3 | L22 |

77-1

| PORT NAME (112) | NEW PORT NAME (114) |
|---|---|
| C | A |
| D | B |

110-1, 110-2 (grouped as 110)

| LUN NAME (118) | NEW LUN NAME (120) | LUN # (122) | NEW LUN # (124) |
|---|---|---|---|
| a0 | m | L00 | 40 |
| b0 | n | L01 | 41 |
| c0 | p | L02 | 42 |
| d0 | q | L10 | 50 |
| e0 | r | L11 | 51 |
| f0 | s | L12 | 52 |

SYSTEM AND METHOD OF NON-DISRUPTIVE DATA MIGRATION BETWEEN HETEROGENEOUS STORAGE ARRAYS

FIELD OF THE INVENTION

The present invention relates generally to storage area networks. More particularly, the present invention relates to system and method of non-disruptively migrating data between physical storage arrays in a storage area network.

BACKGROUND

Today's enterprise data centers store ever-larger amounts of business critical data that must be immediately and continuously available, and highly reliable. Information technologists, storage managers, and administrators of storage systems take many precautions to protect against the effects of failures in order to avoid downtime. Occasionally, however, a particular storage system, such as a storage array, requires upgrading or replacement.

To replace a current storage array with a new storage array, all data and connections on the current storage array must be migrated to the new array. The storage system then requires re-initialization. In addition, the host systems previously communicating with the replaced storage array require reconfiguration. This re-initialization and reconfiguration requires some downtime to complete; consequently, host applications can lose access to the storage array during this period, and potentially to some critical information. For many business systems running critical applications, this interruption is unacceptable.

In addition, many organizations employ a multi-vendor strategy that leads to a heterogeneous information technology (IT) environment. For example, some organizations maintain heterogeneous environments for reasons such as a tiered-storage practice, a legacy of decentralized purchasing decisions, or the result of a merger or acquisition. Many organizations also support a variety of operating systems in their data centers. Further, organizations may have aging but important applications running on older storage arrays. A consequence is that migration options are limited between heterogeneous storage arrays and multiple operating systems because of the complexity and the relative lack of adequate tools. The latest array-based copy tools are usually not compatible with the older arrays. Moreover, volume managers and multi-path software often have significant limitations with server-based migration tools. There is a need, therefore, for systems and methods of upgrading or replacing storage arrays transparently with respect to host systems communicating with the storage arrays, particularly in IT environments having heterogeneous storage arrays.

SUMMARY

In one aspect, the invention features a method for non-disruptively migrating data from a source storage array to a destination storage array where the source and destination storage arrays are heterogeneous. The method comprises querying a name server database, used by hosts to learn name and address associations of devices, to obtain port names for each source port of the source storage array and communicating with the source storage array to obtain information about the source storage array and about each logical unit of storage (LUN) of the source storage array. A target array is generated at the destination storage array for receiving a copy of data resident at the source storage array. The target array has at least as many ports as physical source ports of the source storage array and at least as many LUNs as LUNs of the source storage array. Each LUN of the source storage array corresponds to one of the LUNs of the target array and is equal in storage capacity as that corresponding LUN. All data resident in the LUNs of the source storage array are copied to corresponding LUNs in the target array. The name server database is induced to reconfigure so as to associate port names of the physical source ports with the port addresses of the target ports of the target array such that the target array appears to a host as the source storage array.

In another aspect, the invention features a storage area network comprising a switch and a name server database that associates names and addresses of ports coupled to the switch. The name server database is accessible to one or more hosts for learning name and address associations. A source storage array has one or more source ports coupled to the switch. Each source port has a source port name and a source port address. A destination storage array has a target array for receiving a copy of all data resident at the source storage array. The target array is configured with at least as many ports as physical source ports of the source storage array and with at least as many logical units of storage (LUNs) as LUNs of the source storage array. Each LUN of the source storage array corresponds to one of the LUNs of the target array and is equal in storage capacity as that corresponding LUN. Each port of the target array has a port name and port address. Logic copies all data resident in the LUNs of the source storage array to corresponding LUNs in the target array, and logic induces reconfiguration of the name server database to associate port names of the source physical ports with the port addresses of the target ports such that the target array appears to each host as the source storage array.

In still another aspect, the invention features a computer program product comprising a computer-useable medium having a computer-readable program code embodied in said medium for non-disruptively migrating data in a storage area network from a source storage array to one or more destination storage arrays. The computer readable program code in said medium comprises computer-readable program code for causing the storage area network to query a name server database, used by hosts to learn name and address associations of devices, to obtain port names for each source port of the source storage array. The computer readable program code in said medium further comprises computer-readable program code for causing the storage area network to communicate with the source storage array to obtain information about the source storage array and about each logical unit of storage (LUN) of the source storage array and to generate a target array at the destination storage array for receiving a copy of data resident at the source storage array. The target array has at least as many ports as physical source ports of the source storage array and at least as many LUNs as LUNs of the source storage array. Each LUN of the source storage array corresponds to one of the LUNs of the target array and is equal in storage capacity as that corresponding LUN. Computer-readable program code causes the storage area network to copy all data resident in the LUNs of the source storage array to corresponding LUNs in the target array and to reconfigure the name server database to associate port names of the physical source ports with the port addresses of the ports of the target array such that the target array appears to a host as the source storage array.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 3 is a diagram of an embodiment of a name server table maintained by the switch before the data migration.

FIG. 4 is a diagram of an embodiment a LUN table maintained by one of the hosts before the data migration.

FIG. 6 is a diagram of an embodiment of the name server table maintained by the switch after completion of the data migration to the virtual array of the destination storage array.

FIG. 7 is a diagram of an embodiment the LUN table maintained by the host after the data migration.

FIG. 8 is a translation table for translating port names, maintained by the destination storage array FIG. 9 is a translation table for translating LUN names and LUN numbers, maintained by the destination storage array.

DETAILED DESCRIPTION

Figure 1:
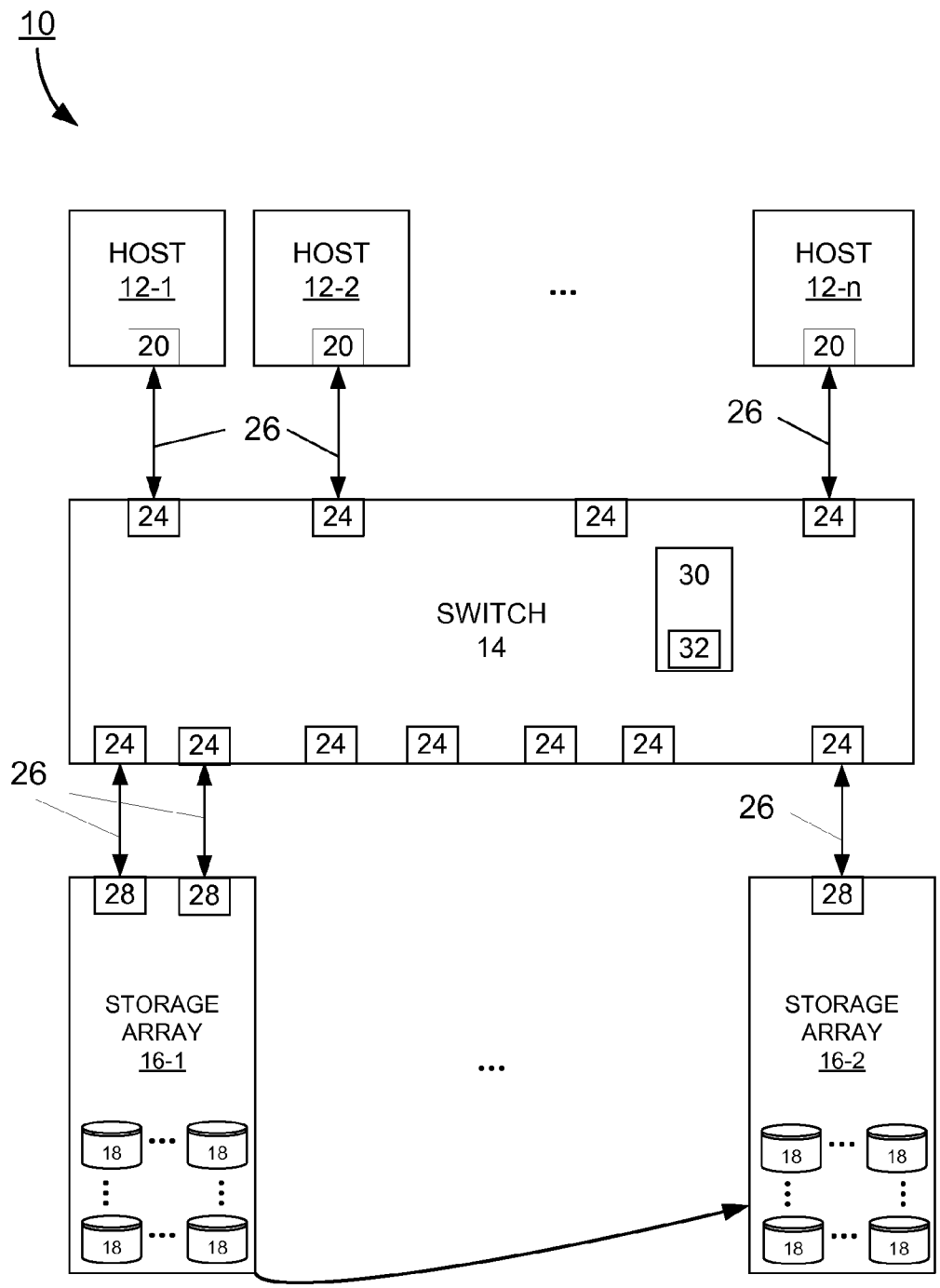
FIG. 1 is a block diagram of an embodiment of a storage area network including a plurality of hosts in communication with multiple storage arrays through a switch.

FIG. 1 shows an exemplary storage area network 10 in which the invention may be embodied. The storage area network 10 employs a Fibre Channel fabric topology. Fibre Channel is a high-speed serial transport used in storage systems. The transport is described in a series of standards that can be found at X3T9.3 *Task Group of ANSI: Fibre Channel Physical and Signaling Interface (FC-PH)*, Rev. 4.2 Oct. 8, 1993.

The storage area network 10 includes a plurality of hosts 12-1, 12-2, and 12-n (generally, host 12), a Fibre Channel fabric or switch 14, and a plurality of storage arrays 16-1, 16-2 (generally, storage array 16). More than two storage arrays 16 can be part of the storage area network 10, as indicated by the ellipsis. Each host 12 includes a host port 20 that is coupled to one of the switch ports 24 of the switch 14 by a Fibre Channel link 26.

Each storage array 16 includes an array of disks (or disk drives) 18 and one or more array ports 28. The disks 18 are arranged into logical units (not shown), called LUNs, originally a SCSI (small computer system interface) term, now commonly used to describe a logical unit of physical storage space. A LUN can encompass a portion of a disk 18, or portions of multiple disks 18, or multiple complete disks 18. Each array port 28 is coupled to one of the switch ports 24 of the switch 14 by a Fibre Channel link 26.

In a Fibre Channel system, such as that of FIG. 1, each Fibre Channel device (including, but not limited to, host ports 20, array ports 28, and LUNs) has two identifying characteristics—a name and an address. Fibre Channel names, known as "world wide names", are unique—every Fibre Channel device in the world has its own unique name. Fibre Channel addresses, individually referred to in Fibre Channel parlance as an "ID", are dynamic and dependent upon the configuration of the Fibre Channel system. Port addresses are referred to as "port IDs". The port IDs are used for directing information between the hosts 12 and the LUNs of the storage arrays 16 in the storage area network 10.

In a Fibre Channel fabric topology, the switch 14 assigns IDs to the host ports 20 and array ports 28 during Fibre Channel system initialization. IDs, as described in the Fibre Channel specification, are 24-bit quantities containing several fields. For purposes of this description, it is sufficient to understand that the ID assigned to an array port 28 is a derivative of the switch name and the ID of the switch port 24. Thus, a name of an array port 28 depends on the switch port 24 to which that array port 28 is coupled. An exemplary implementation of a registration process by which the switch 14 assigns port IDs to host ports 20 and array ports 28 is described in U.S. patent application Ser. No. 11/318,757, filed Dec. 27, 2005, titled "Presentation of Virtual Arrays Using N-Port ID Virtualization," the entirety of which is incorporated by reference herein.

The switch 14 uses a name server database 30 to assign IDs to host ports 20 and to array ports 28 during system initialization. The name server database 30 includes a name server table 32 used by the switch 14 to resolve port IDs to port names. In one embodiment, the Fibre Channel switch 14 maintains the name server database 30 and name server table 32. In another embodiment, a name server, separate and distinct from the switch 14, maintains the name server database 30 and the name server table 32.

After Fibre Channel system initialization, the hosts 12 communicate with the array ports 28 and LUNs of the storage arrays 16 by sending messages to the appropriate array port ID and LUN number (i.e., address) using a cross-point Fibre Channel connection through the switch 14. The hosts 12 can adapt to new array port IDs and LUN addresses, but each Fibre Channel device in use maintains its same name in order for uninterrupted communications to continue.

Storage area networks embodying the present invention perform data migration events between storage arrays transparently with respect to the hosts 12 that may be communicating with the storage arrays 16. To achieve this transparency, the destination storage array 16-2 acquires the connection information (e.g., the names of the array ports and LUNs) of the source storage array 16-1. The acquisition of the connection information enables the hosts 12 to communicate with the destination storage array 16-2 instead of with the source storage array 16-1 after the data of the LUNs migrate to the destination storage array 16-2.

In addition, the host communication with the LUNs is undisrupted by the data migration. Such non-disruptive data migration, as described herein, can occur between a first full array at the source storage array and a second full array at the destination storage array, between a first virtual array at the source storage array to a first virtual array at the destination storage array, or between a full array at the source storage array and a virtual array spanning one or more destination storage arrays, depending upon the particular types of source and target arrays participating in the migration.

The source and destination storage arrays participating in a data migration can be homogeneous or heterogeneous. Heterogeneity among storage arrays can arise because of a variety of differences between the arrays examples of which include, but are not limited to, sizes (i.e., storage capacity) of the source and destination storage arrays, the sizes and other physical characteristics of the storage devices (e.g., disks) of the storage arrays, and the performance (e.g., speed, protocols) of the storage arrays and of the disks of the storage arrays. Multi-vendor environments are a type of IT environment commonly having heterogeneous storage arrays. Upgrading a storage system, for example, can entail replacing a legacy storage array with a heterogeneous storage array of larger storage capacity.

Figure 2:
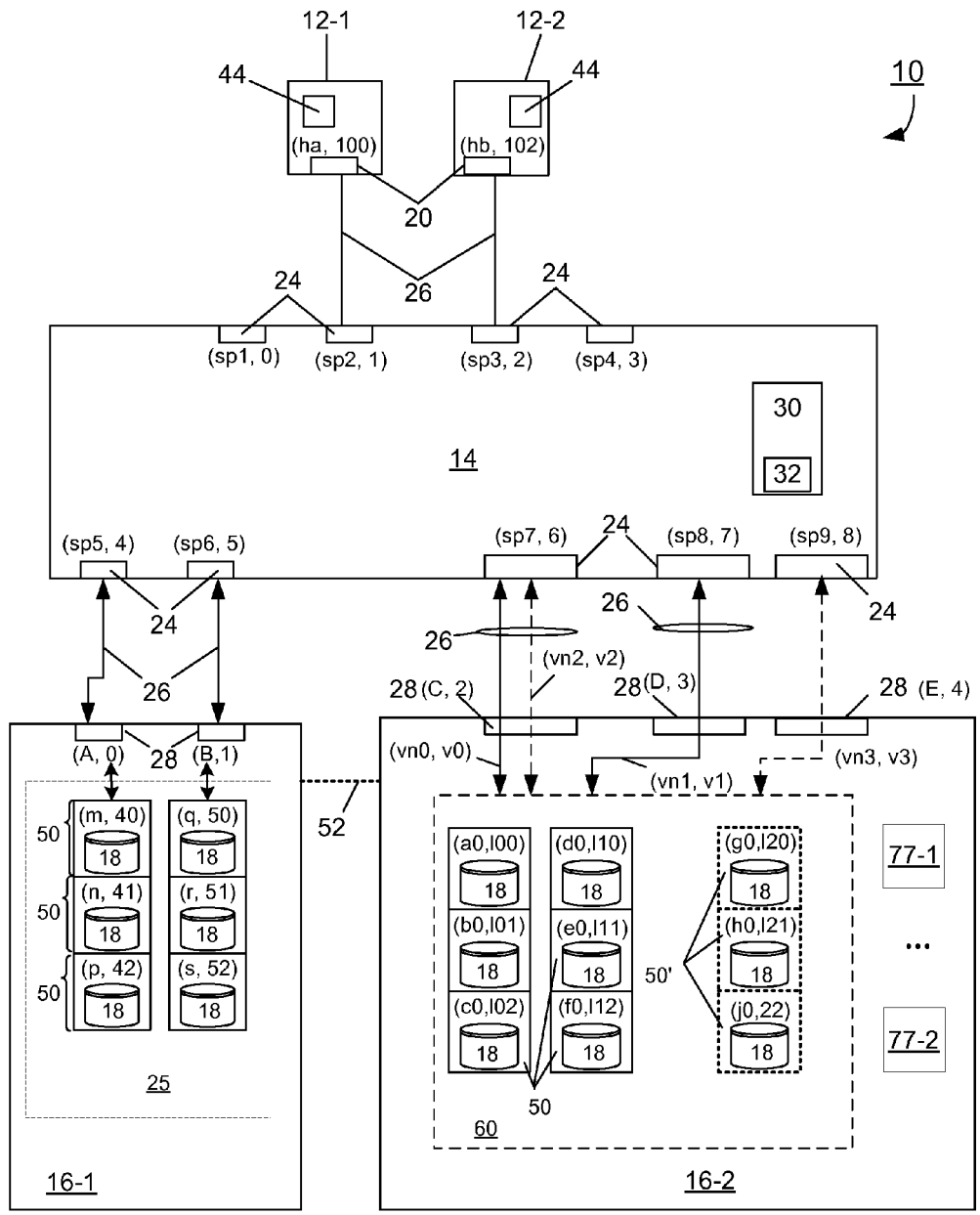
FIG. 2 is a block diagram of an embodiment of the storage area network in which data are migrated non-disruptively from a source storage array to a virtual array in a destination storage array.

FIG. 2 shows an embodiment of the storage area network 10 in which all data stored in a first physical storage array 16-1 are to be migrated to a virtual array at a second physical storage array 16-2. The first physical storage array 16-1 represents the source storage array for the data migration and includes a full array 25 (i.e., storage devices in which data residing at the storage array 16-1 are accessed by hosts 12 through physical port addresses). The second storage array 16-2 represents the destination storage array for the data migration and includes a virtual array 60 configured to receive a copy of all data of the full array 25. The destination storage array 16-2 has an equal or greater storage capacity than the source storage array 16-1. In this embodiment, the source and destination storage arrays 16-1, 16-2 are homogeneous.

In addition, FIG. 2 shows the names and IDs of the various Fibre Channel devices (i.e., host ports, array ports, switch ports, LUNs) symbolically as alphanumeric name-ID pairs (name, ID). For example, the name-ID pair for the host port 20 of host 12-1 is (ha, 100) and for the host port 20 of host 12-2 is (hb, 102). For the switch ports 24, the exemplary name-ID pairs are (sp1, 0), (sp2, 1), (sp3, 2), (sp4, 3), (sp5, 4), (sp6, 5), (sp7, 6), (sp8, 7), and (sp9, 8). Switch port (sp2, 1) is coupled to a host port (ha, 100) on the host 12-1 and switch port (sp3, 2) is coupled to a host port (hb, 102) on the host 12-2.

The source storage array 16-1 includes array ports 28. The exemplary name-ID pairs of the array ports 28 are (A, 0) and (B, 1). Array port (A, 0) is coupled to switch port (sp5, 4) and array port (B, 1) is coupled to switch port (sp6, 5). Although FIG. 2 shows two array ports 28, the source storage array 16-1 can have more or less array ports 28 in number.

The full array 25 of the source storage array 16-1 includes disks 18 mapped into LUNs 50. The full array 25 at the source storage array 16-1 can have more or fewer disks 18 and LUNs 50 than those shown. Here, each LUN 50 maps to a complete, separate disk 18 for convenience of description. As previously noted, other types of LUN-to-disk mappings may be used in the practice of the invention. In general, a LUN may have more than one LUN number for purposes of LUN access by multiple hosts 12 through multiple array ports 28. For clarity of the present description, each LUN has one LUN number. Exemplary name-LUN number pairs of these LUNs 50 are LUNs (m, 40), (n, 41), and (p, 42), which are accessible by array port (A, 0), and LUNs (q, 50), (r, 51), and (s, 52), which are accessible by array port (B, 1).

The destination storage array 16-2 includes array ports 28 and disks 18 mapped into LUNs 50. The exemplary name-ID pairs of the array ports 28 are (C, 2), (D, 3), and (E, 4). Again, for convenience of description, each LUN 50 maps to a complete, separate disk 18. Each LUN 50 has a name/number pair (e.g., the LUN labeled (a0, L00) has a name of "a0" and a LUN number of L00). In this illustration, the LUNs 50 of the destination storage array 16-2 are grouped into the virtual array 60. Although FIG. 2 shows destination storage array 16-2 as having only the one virtual array 60, the destination storage array 16-2 can have one or more other virtual arrays comprised of groupings of other LUNs (not shown).

To be able to receive a copy of all data of the LUNs 50 of the full array 25, the number of LUNs 50 and the data capacities of such LUNs 50 of the virtual array 60 are at least that of the full array 25. In addition, the virtual array 60 has at least as many virtual ports as the number of physical array ports 28 associated with the full array 25. That is, there is a one-to-one correspondence between each physical array port 28 of the source storage array 16-1 and one of the virtual ports of the virtual array 60. To support data migration from one or more full arrays to one or more virtual arrays, the destination storage array (e.g., 16-2) has to be able to provide one virtual port for each physical array port associated with the migrating full array. In this example, two virtual ports associated with the virtual array 60, identified as virtual port (v0) and virtual port (v1), have a one-to-one correspondence with a physical array port 28 of the source storage array 16-1. The destination storage array 16-2 can have an equal number, more, or fewer physical array ports 28 than the number of array ports 28 associated with full arrays being migrated.

In addition, the virtual array 60 can be configured with "extra" virtual ports, "extra" LUNs, or both. Extra, in this context, means an additional resource not needed by the virtual array 60 to assume the identity of the full array 25. Each extra resource provides the virtual array 60 additional capabilities. For instance, extra LUNs give the virtual array 60 additional storage capacity, whereas extra virtual ports increase bandwidth for accessing the virtual array 60 or enhance zoning capabilities. The exemplary virtual array 60 of FIG. 2 has additional virtual ports (v2) and (v3) and extra LUNs 50'.

In the exemplary implementation shown in FIG. 2, the virtual array 60 is accessible through array port (C, 2), which is coupled to switch port (sp7, 6), through array port (D, 3), which is coupled to switch port (sp8, 7), and through array port (E, 4), which is coupled to switch port (sp9, 8). The virtual ports (v0) and (v2) are multiplexed over the physical array port (C, 2), the virtual port (v1) is multiplexed over physical array port (D, 3), and the virtual port (v3) is multiplexed over physical array port (E, 4). In other implementations, both virtual ports (v0) and (v1) can be established to pass through the same physical array port (i.e., (C, 2), (D, 3), or (E, 4)).

When the destination storage array 16-2 logs in to the switch 14, the switch 14 assigns the virtual port IDs to the virtual ports of the virtual array 60. A process for grouping LUNs into virtual arrays, assigning virtual port IDs thereto, and presenting such virtual arrays to the hosts 12 are described in U.S. patent application Ser. No. 11/318,757, filed Dec. 27, 2005, and titled "Presentation of Virtual Arrays Using N-Port ID Virtualization". Hereafter, a switch that is capable of provisioning unique virtual port IDs in support of virtual arrays is referred to as NPIV (N-Port ID Virtualization)-capable.

The source storage array 16-1 exports its LUNs 50 for access by the hosts 12 over the Fibre Channel links 26 through the switch 14. After the hosts 12 know the port IDs by which to access the array ports 28, the hosts 12 can learn which LUNs the source storage array 16-1 has made available. Management of LUN names and LUN numbers occurs at the storage arrays 16. Each host 12 sends a query to each array port 28, requesting a list of available LUN numbers. After a host 12 learns each LUN number for a given array port ID, the host 12 can query each LUN 50 using a combination of the port ID and LUN number to access the corresponding LUNs. The host 12 can then query each LUN 50 for its corresponding LUN name. After collecting this LUN information from the storage arrays 16, the host 12 builds a directory LUN table 44 that relates LUN names and LUN numbers to port IDs.

For transmitting the data being migrated from the full array to the virtual array, in one embodiment a point-to-point communications link 52 connects the destination storage array 16-2 to the source storage array 16-1. Alternatively, the migrating data can pass through the switch 14. The storage arrays 16-1, 16-2 can also use the link 52 for exchanging other types of information, such as metadata, messages, connection information, and management information. To achieve a transparency of communication with the hosts 12, the destination storage array 16-2 builds a first translation table 77-1 for translating current port names to new port names and a second translation table 77-2 for translating current LUN names and LUN numbers to the new LUN names and LUN numbers, as described further below.

FIG. 3 shows an example of the name server table 32 maintained by the switch 14 for the source and destination storage arrays 16-1, 16-2 of FIG. 2. The contents of the name server table 32 reflect completion of the registration process, described above, for the full array 25 before any data migration. The name server table 32 includes a plurality of entries 34-1 and 34-2, (generally, entry 34). Each entry 34 includes a port name field 36, a physical port ID field 38, a virtual port name field 40, and a virtual port ID field 42. By the registration process, the switch 14 populates the entries 34 with the physical and virtual port names (if any) of the array ports 28 and the physical and virtual port IDs (if any) assigned by the switch 14 to the storage arrays 16-1, 16-2.

The two entries 34-1, 34-2 correspond to the array ports 28 associated with the source storage array 16-1: array port A has port ID 0, and array port B has port ID 1. The virtual port name and virtual port ID fields 40, 42 do not apply (N/A) to these entries 34-1, 34-2 because the array ports 28 of the source storage array 16-1 are not mapped to any virtual array prior to data migration.

FIG. 4 is a diagram of an example of the LUN table 44 maintained by a host after querying the source storage array 16-1 of FIG. 2, as described above. The LUN table 44 includes an entry 46 for each discovered LUN 50. Each entry 46 includes a LUN name field 47, a port ID field 48 and a LUN number field 49. In combination, the information in these fields 47, 48, and 49 identifies a given LUN 50 and associates that LUN to a particular port ID.

In this pre-data migration example, the LUN table 44 for a host 12 of FIG. 2 includes entries 46 for each of the LUNs 50 of the full array 25. As representative examples, entry 46-1 corresponds to a LUN of the fully array 25 and has a name of "m" and a LUN number of 40. LUN (m, 40) is associated with port ID 0 of the source storage array 16-1.

Figure 5:
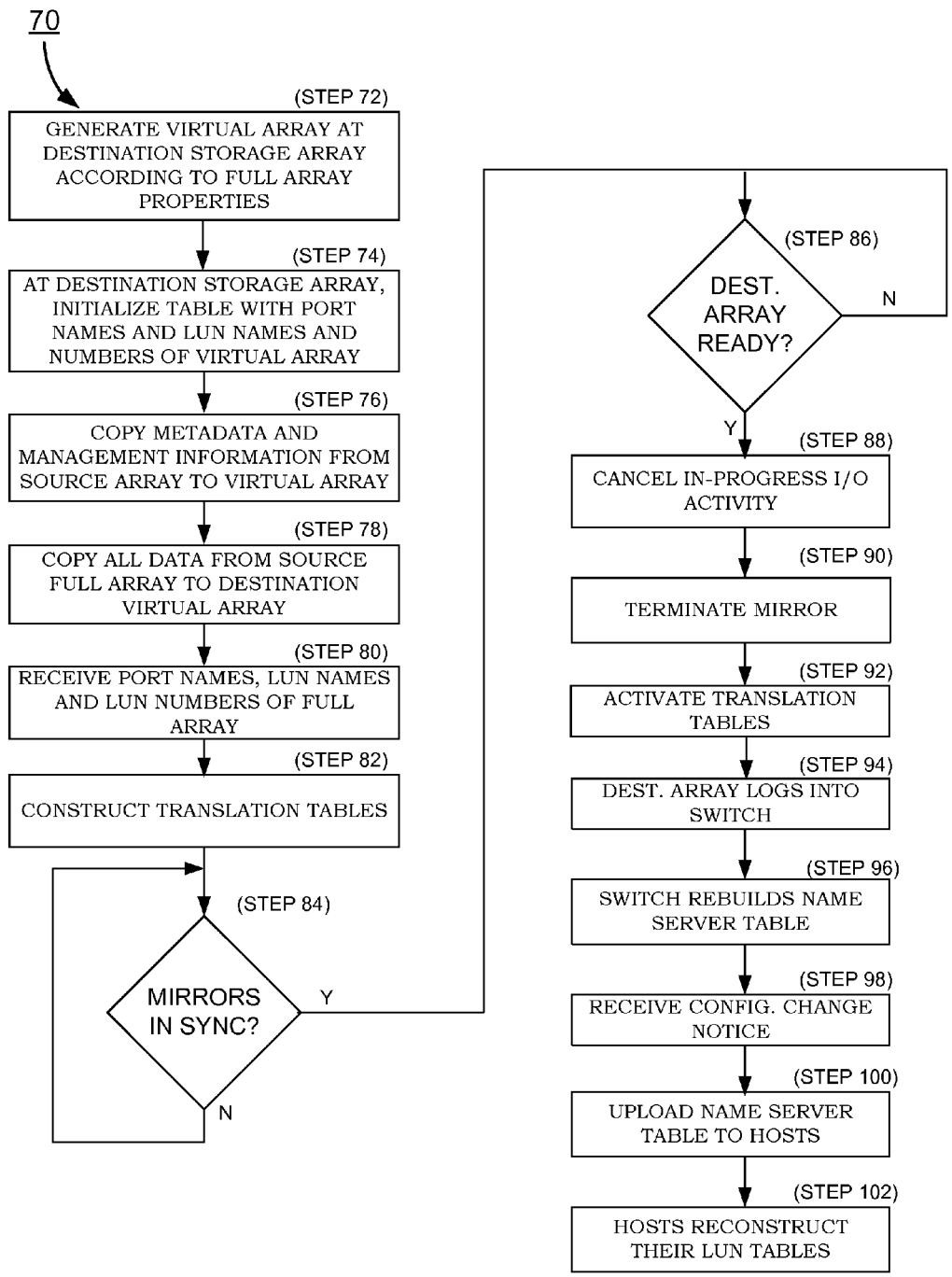
FIG. 5 is an embodiment of a process for migrating data from a full array at a source storage array to a virtual array at a destination storage array.

FIG. 5 shows an embodiment of a process 70 for migrating data from the full array 25 at the source storage array 16-1 to the virtual array 60 at the destination storage array 16-2. At step 72, logic executing at the switch 14 generates the virtual array 60 at the destination storage array 16-2, giving the virtual array 60 properties suited to receive a copy of all data stored in the full array 25. More specifically, for each LUN of the full array 25, the virtual array 60 has a corresponding LUN of equal storage capacity, and for each array port of the full array, a corresponding virtual port. In addition, the associations between virtual ports and LUNs of the virtual array are the same as the associations between the array ports 28 and LUNs of the full array.

For example, virtual port v0 corresponds to port (A, 0), and is used to access LUNs (a0, L00), (b0, L01) and (c0, L02), which correspond one-to-one to LUNs (m, 40), (n, 41) and (p, 42) of the full array 25. Similarly, the virtual port v1 corresponds to the other array port (B, 1) of the full array 25 and is used to access the three LUNs (d0, L10), (e0, L11) and (f0, L12) of the virtual array 60 that correspond one-to-one to the other three LUNs (q, 50), (r, 51) and (s, 52) of the full array 25.

In addition, the virtual array 60 can also be configured with extra virtual ports, such as virtual ports (v2) and (v3), and with extra LUNs (g0, L20), (h0, L21) and (j0, L22), as described above. These virtual ports (v2) and (v3) may be configured to access any of the LUNs 50, 50' in the virtual array 60. The destination storage array 16-2 initializes (step 74) a table with the physical port names, LUN names, and LUN numbers associated with the virtual array 60.

At step 76, the metadata and management information of the full array 25 is copied and stored to the destination storage array. An example of a process for migrating metadata and management information is described in U.S. patent application Ser. No. 11/427,677, filed Jun. 29, 2006, titled "Partitioning of a Storage Array into N-Storage Arrays Using Full Array Non-Disruptive Data Migration", the entirety of which is incorporated by reference herein. Metadata, in this context, refers to data associated with applications that extend storage functionality, examples of which are data back-up applications. In general, the metadata represents information critical to the proper operation of the extended storage functionality application. If a data migration event occurs during execution of an extended storage functionality application, then migration of the metadata to the destination storage array ensures that the extended storage functionality application can continue to operate properly, i.e., uninterrupted during and after the data migration event.

Management information, in this context, relates to control plane functionality. The transfer of management information makes the migration of data and connection information transparent to management applications used by administrators to manage their storage networks. That is, management applications can continue to communicate with the storage arrays, unaffected or uninterrupted by the data and connection migration, in effect, unaware of the full transfer of data from one storage array to another storage array.

Subsequently, remote replication software, running at a host 12 or at the switch 14, replicates (step 78) the data in the LUNs 50 of the full array 25 and stores the replicated data in the corresponding LUNs 50 of the virtual array 60. In general, the remote replication software sets up a primary mirror, and copies that mirror and all updates to a secondary mirror. Data migration products called MirrorView and SRDF/S (Symmetrix Remote Data Facility), both of EMC Corp. of Hopkinton, Mass., are examples of remote replication software that can be used to perform the data replication and transfer for homogeneous arrays.

At step 80, the destination storage array 16-2 receives, from the source storage array 16-1, the port names, LUN names, and LUN numbers associated with the full array 25. The destination storage array 16-2 constructs (step 82) translation tables for mapping current port names, LUN names, and LUN numbers of the virtual array 60 to new port names, LUN names, and LUN numbers of the full array 25. In effect, the port names, LUN names, and LUN numbers of the full array 25 replace the port names, LUN names, and LUN numbers of the virtual array 60 at the destination storage array 16-2.

After the remote replication process indicates synchronization of the arrays (step 84), the arrays 16-1, 16-2 perform a handshake function to determine when the destination storage array 16-2 is ready to use the new port names, LUN names, and LUN numbers (step 86). When the destination storage array 16-2 is ready, any in-progress I/O activity is cancelled, if necessary (step 88). (It may or may not be necessary to cancel in-progress I/O activity to the source and/or destination array, as this is controlled by design considerations).

When both arrays are ready, the mirror process is terminated (step 90). The destination storage array activates (step 92) its translation tables, which enables the new port names, LUN names, and LUN numbers for use by the destination storage array 16-2. Logic on the switch, source array, or destination array may alter the zoning on the switch 14 to restrict which hosts 12 may access the virtual array 60, as described in U.S. patent application Ser. No. 11/318,757, filed Dec. 27, 2005, titled "Presentation of Virtual Arrays Using N-Port ID Virtualization". At step 94, the destination storage array 16-2 logs into the switch 14, causing the switch 14 to rebuild (step 96) the name server table 32. The switch 14 subsequently receives (step 98) notification of a configuration change. In this embodiment of the process 70, both changing the zoning and logging into the switch induces the notification of the configuration change. In other embodiments, the occurrence of either event, without the other, causes the notification. In response to the notification of the configuration change, the switch 14 uploads (step 100) the new name server table 32 to the hosts 12. The hosts 12 then query (step 102) the destination storage array 16-2 to discover the LUN names and LUN numbers associated with the port IDs and to rebuild their LUN tables 44.

In accordance with an embodiment, causing the switch 14 to recognize a "link bounce" produces the notification of the configuration change. A link bounce causes temporary inaccessibility of the destination storage array 16-2 and is transparent to the hosts 12. In accordance with Fibre Channel protocol, the switch 14 responds to the link bounce by sending the name server table 32 to all registered SAN devices. A trigger for a link bounce may be, for example, a quick disabling and re-enabling of a Fibre Channel transmitter.

Other mechanisms can serve to implement the configuration change. For example, the destination storage array 16-2 can cause a logout and subsequent login. As another example, a temporary I/O glitch could be caused. Any means for causing the switch 14 to recognize the configuration change can be used in the practice of the invention.

FIG. 6 shows the exemplary contents of the name server table 32, as maintained by the switch 14, after the switch 14 rebuilds the name server table as described above in step 96. Here, for example, entries 34-1, 34-2 map array port name A to array port ID 2 and to virtual port name-ID pairs (vn0, v0) and (vn2, v2), respectively. Entry 34-3 maps array port name B to array port ID 3 and to virtual port name-ID pair (vn1, v1). Entry 34-4 maps array port name E to array port ID 4 and to virtual port name-ID pair (vn3, v3). Accordingly, the name server table 32, which previously associated the array port names A and B to array port IDs of the source storage array 16-1, now associates these array port names with array port IDs of the destination storage array 16-2 and with the virtual port names and virtual port IDs of the virtual array 60.

FIG. 7 shows the exemplary contents of the LUN table 44, as maintained by a host 12, after that host 12 queries the destination storage array 16-2 to discover its LUNs and LUN numbers in response to the newly uploaded name server table 32 described in step 100. The LUN table 44 indicates that the LUNs having LUN name-number pairs (m, 40), (n, 41), and (p, 42) are now associated with (virtual) port ID v0 and with virtual port v2 and that LUN name-number pairs (q, 50), (r, 51), and (s, 52) are now associated with (virtual) port ID v1. In addition, LUN name-number pairs for the LUNs (g0, L20), (h0, L21), and (j0, L22) are associated with virtual port ID v3.

FIG. 8 shows an embodiment of a translation table 77-1 including an entry 110 for each array port through which the virtual array 60 can be accessed. Each entry 110 contains the current array port name 112, and a new array port name 114 received from source storage array 16-1. One entry 110-1 of the translation table 77-1 associates array port name C with array port name A, and a second entry 110-2 associates array port name D with array port name B. The table 77-1 may or may not include an entry 110 for the physical array port name E if that array port name is not being replaced by an array port name of associated with the full array 25. In one embodiment of the table 77-1, an entry 110 for physical array port name E is included.

FIG. 9 shows an embodiment of a second translation table 77-2 that translates current LUN names and LUN numbers to the new LUN names and LUN numbers. The translation table 77-2 includes an entry 116 for each LUN of the virtual array 60. Each entry 116 includes the current LUN name 118 and current LUN number 122 and the new LUN name 120 and new LUN number 124 received from the source storage array. In the illustrated example, the translation table 77-2 has six entries 116. The current LUNs name-number pairs of the virtual array (a0, L00), (b0, L01), (c0, L02), (d0, L10), (e0, L11) and (f0, L12) are associated with the current full array LUN name-number pairs (m, 40), (n, 41), (p, 42), (q, 50), (r, 51) and (s, 52). The translation table 77-2 may or may not have any entries 116 for the extra LUNs 50' because such LUNs 50' do not correspond to any particular LUN 50 migrated from the full array 25. In one embodiment of the translation table 77-2, the entries 116 for the extra LUNs 50' are included. The information in the tables 77-1, 77-2 can be stored as one table, or as separate tables, in accordance with design requirements and convenience.

From the perspective of the hosts 12, the migration of the data of the LUNs from the full array 25 to the virtual array 60 has occurred transparently. Because data migration does not change the port names, LUN names, or LUN numbers of the full array 25, the hosts 12 can continue to address the LUNs (of the full array, now at the virtual array) just as before the data migration. In addition, although the port IDs of the LUNs have changed, this port ID change appears to the hosts 12 that the full array 25 has, in effect, changed location.

For example, before the data migration, LUN (m, 40) resided at the source storage array 16-1 and was accessible through array port (A, 0). After data migration, the data of LUN (m, 40) resides at the destination storage array 16-2. As previously described, hosts 12 communicate with the LUNs of the storage arrays 16 by sending messages to the appropriate array port ID and LUN number (i.e., address) through the switch 14. Before data migration, hosts 12 addressed messages to LUN (m, 40) using array port ID 0. After data migration, hosts 12 can continue to address messages to LUN (m, 40), now using the new port ID (i.e., v0) in its LUN table 44. Although the new port ID v0 is a virtual port ID, the hosts 12 make no distinction between array port IDs and virtual port IDs. The switch 14 receives such messages and from the name server table 32 determines the array name and array port ID to which to forward the message. In this example, this array name-ID pair is (A, 2). Accordingly, the switch 14 forwards the message to the destination storage array 16-2.

Figure 10:
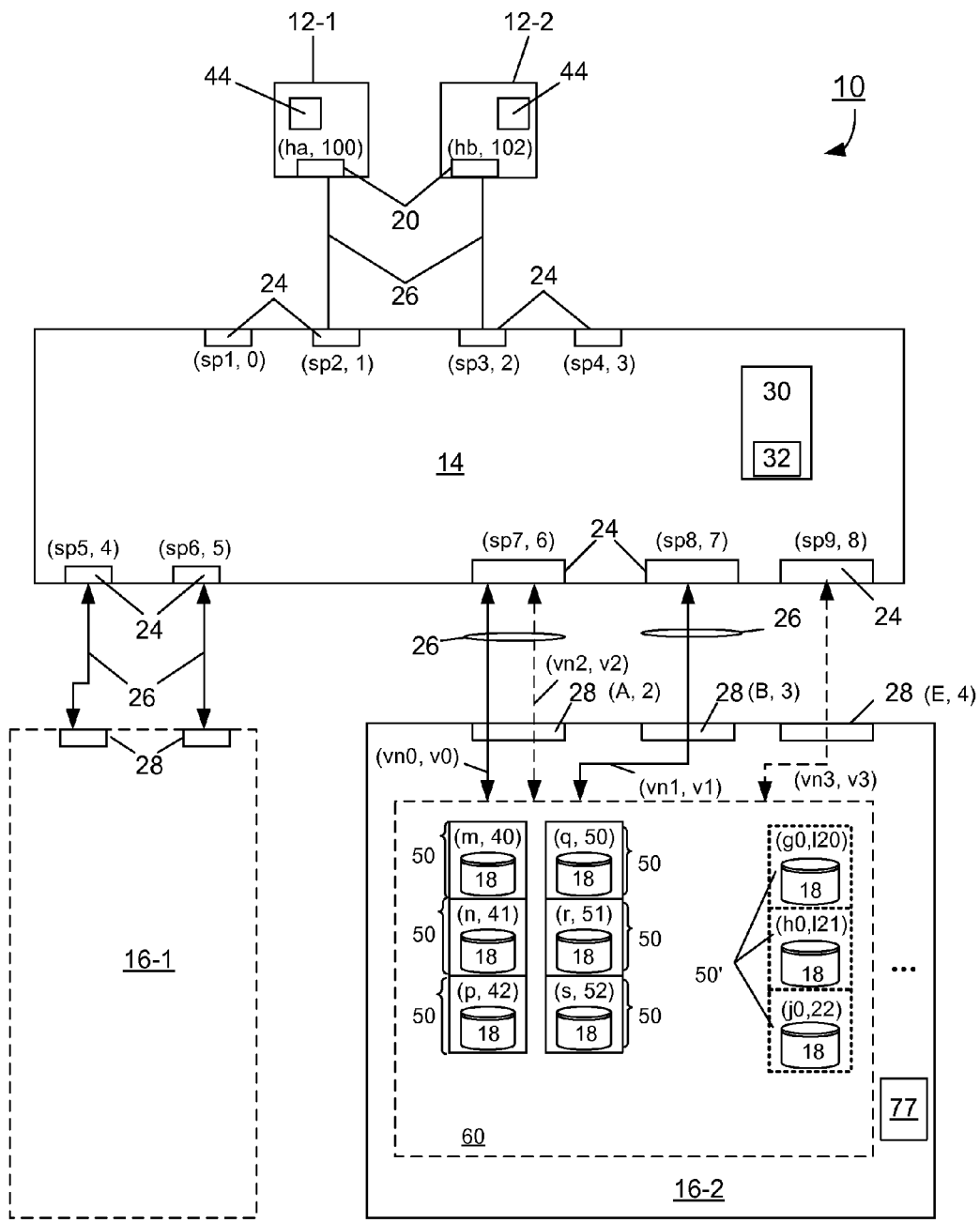
FIG. 10 is a block diagram representation of the destination storage array with the virtual array after data migration.

FIG. 10 shows the storage area network 10 after all data stored in the full array 25 of the source storage array 16-1 (shown in dotted lines) have been migrated to the virtual array 60 at destination storage array 16-2. The dotted lines signify that the source storage array 16-1 has been removed from the storage area network 10 after the completion of the data migration.

The destination storage array 16-2 includes the virtual array 60, which is now accessible through virtual port name-ID pairs (vn0, v0), (vn1, v1), (vn2, v2), and (vn3, v3). The virtual array 60 includes those LUNs previously stored at the full array 25, namely, LUNs (m, 40), (n, 41), (p, 42), (q, 50), (r, 51), and (s, 52). LUNs (m, 40), (n, 41), (p, 42), are accessible by virtual port (vn0, v0) through physical array port (A, 2), and LUNs (q, 50), (r, 51), and (s, 52) by virtual port (vn1, v1) through physical array port (B, 3). The virtual array 60 also includes the extra LUNs 50' identified by LUN name-number pairs (g0, L20), (h0, L21), and (j0, L22), which are accessible by virtual port (vn3, v3) multiplexed over physical array port (E, 4). The destination storage array 16-2 uses the translation tables 77 to correlate communications received and addressed to new port names, new LUN names, and new LUN numbers to the previous names and numbers of the destination storage array 16-2, for purposes of identifying which disks 18 to access in response to such communications.

Figure 11:
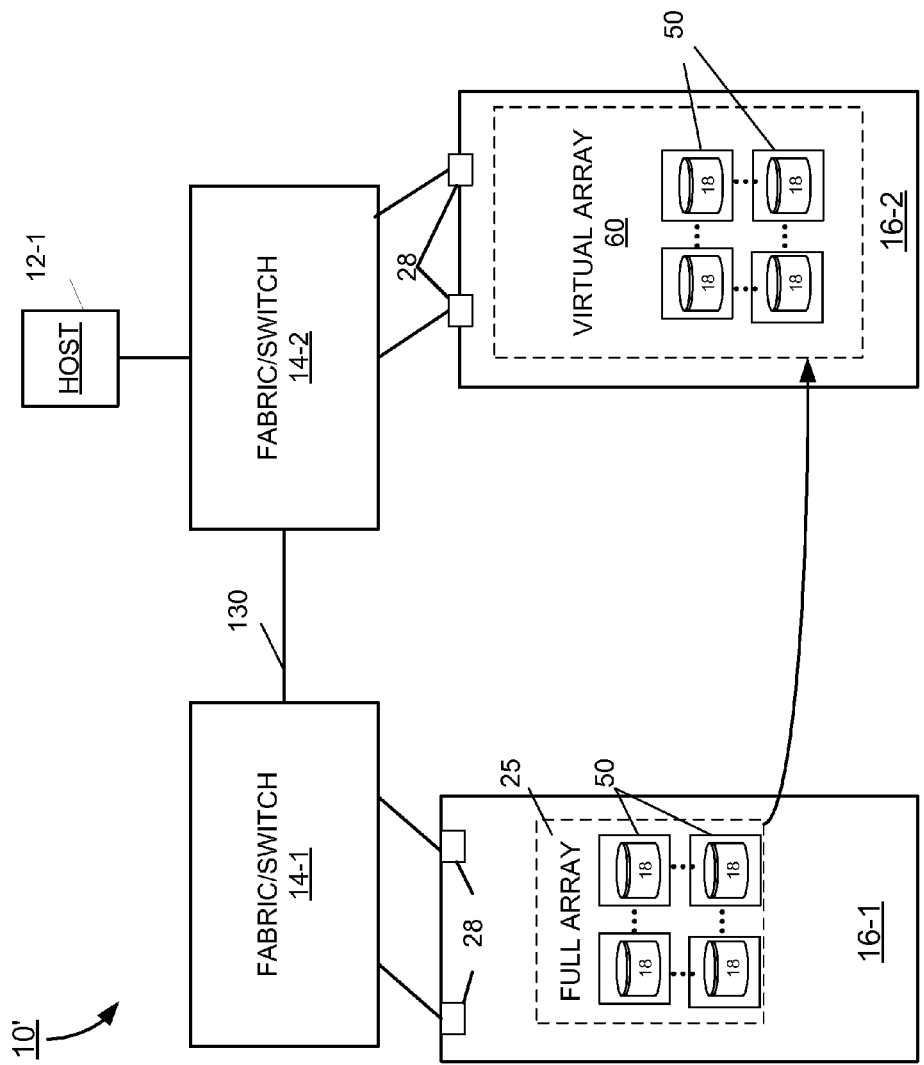
FIG. 11 is a block diagram of an embodiment of a storage area network having multiple switches.

FIG. 11 shows another embodiment of a storage area network 10' having a plurality of Fibre Channel switches 14-1, 14-2 that participate in the migration of data from the full array 25 to the virtual array 60. One switch 14-1 is in communication with the source storage array 16-1, and another switch 14-2 is in communication with the destination storage array 16-2. The switches 14-1, 14-2 are in communication with each other over a communication link 130. To be able to generate and manage the virtual array 60 at the destination storage array 16-2, the switch 14-2 is NPIV-capable, as described above. Switch 14-1 does not need to be NPIV-capable to communicate with the source storage array 16-2 and switch 14-2. Together the switches 14-1, 14-2 cooperatively accomplish the data migration functions performed by the single switch 14 of FIG. 2.

Figure 12:
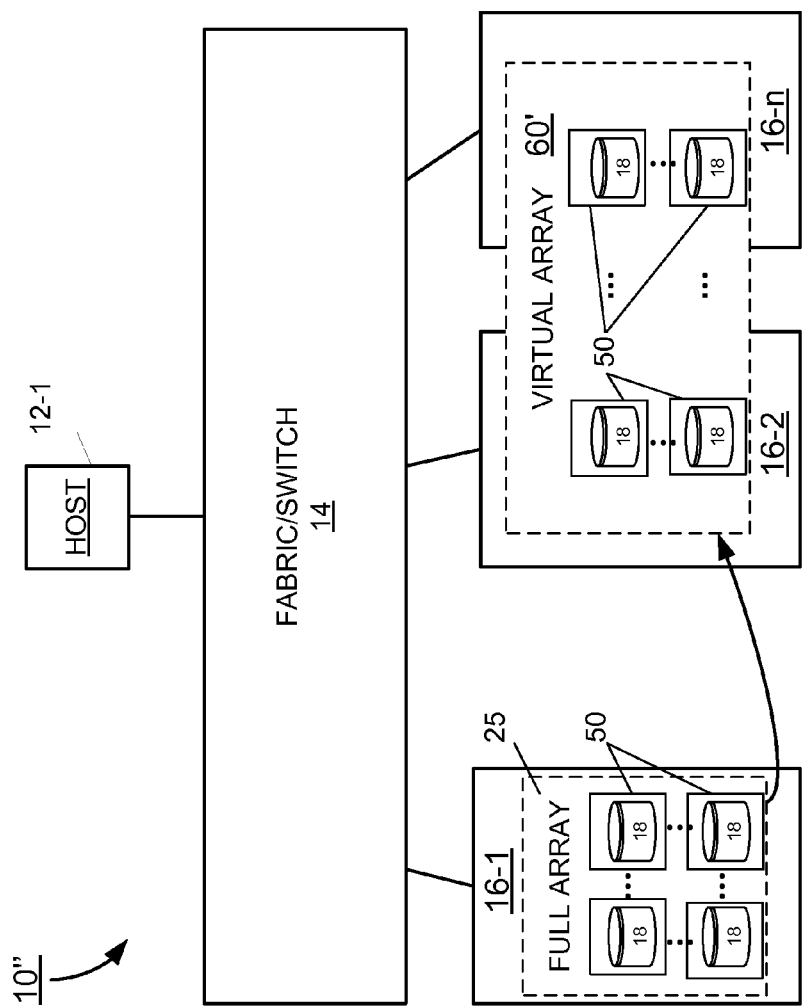
FIG. 12 is a block diagram of an embodiment of a storage area network in which the virtual array spans multiple physical destination storage arrays.

FIG. 12 shows a simplified representation of the storage area network 10 in which data are migrated from the full array 25 at the source storage array 16-1 to a virtual array 60' that spans multiple physical storage arrays 16-2, 16-n. Techniques for implementing virtual arrays that span multiple physical storage arrays (i.e., two or more) is described in U.S. patent application Ser. No. 11/427,646, filed Jun. 29, 2006, titled "Spanning Virtual Arrays across Multiple Physical Storage Arrays", the entirety of which patent application is incorporated by reference herein. After migration to the virtual array 60', the data of the LUNs can physically reside on any one or more of the destination storage arrays 16-2, 16-n and can be accessible through the physical array port 28 of any one or more of those destination storage arrays 16-2, 16-n.

Data Migration Between Heterogeneous Storage Arrays

Figure 13:
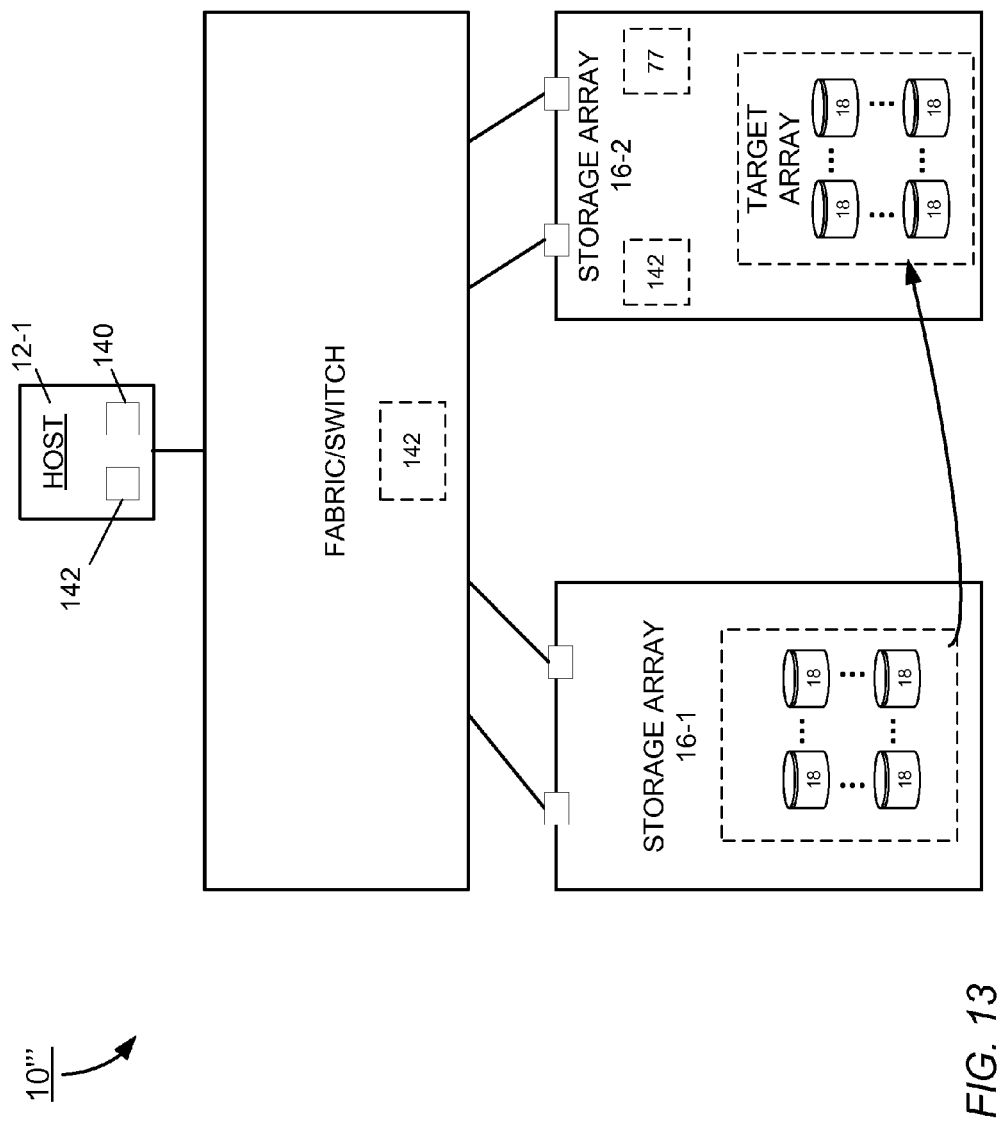
FIG. 13 is a block diagram representation of an embodiment of storage area network in which data migration occurs between heterogeneous storage arrays.

FIG. 13 shows a general embodiment of a storage area network 10" including a host 12-1, a switch 14 in communication with heterogeneous storage arrays 16-1, 16-2. Because the storage arrays 16-1, 16-2 are heterogeneous, remote replication products designed for data transfers between homogeneous storage arrays (e.g., MirrorView™ and SDRF™) are ineffective for migrating data from the source storage array 16-1 to the destination storage array 16-2. To achieve data migration between the heterogeneous storage arrays 16-1, 16-2, the host 12-1 includes a data mobility engine 140 (i.e., software, firmware, hardware, or a combination thereof). The data mobility engine 140 is able to communicate with the source storage array 16-1 and coordinate remote replication of the data stored at the source storage array 16-1 for transfer to the destination storage array 16-2.

To accomplish the remote replication, the host 12-1 coordinates execution of remote replication software 142 capable of acquiring and copying data between heterogeneous storage arrays. Examples of such remote replication software include EMC PowerPath, EMC Invista, and EMC SAN Copy, all available through EMC Corp. The remote replication software 142 can execute at the host 12-1 (e.g., EMC PowerPath), at the switch 14 (e.g., EMC Invista of EMC Corp.), or at the destination storage array 16-2 (e.g., EMC SAN Copy).

For remote replication to occur, information about the physical ports, LUNs, and other connection information of the source storage array 16-1 needs to be acquired. Acquiring such information ensures that the destination storage array 16-2 can be appropriately configured to receive data resident at the storage array 16-1. Because the destination storage array 16-2 does not communicate with the source storage array 16-1 to obtain this information, the data mobility engine 140 communicates with the source storage array 16-1 for this purpose.

Figure 14:
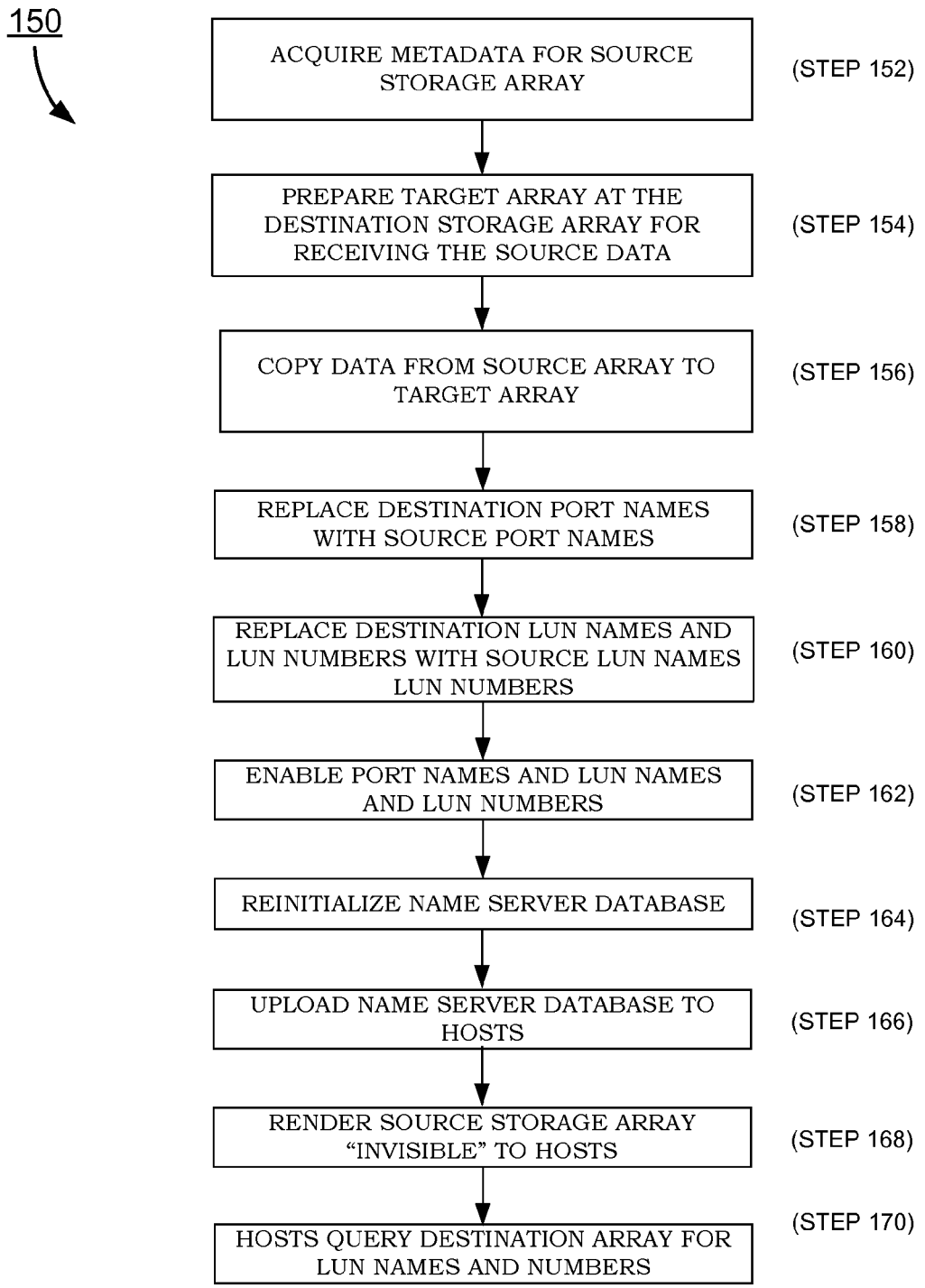
FIG. 14 is a flow diagram representation of a process for migrating data non-disruptively between heterogeneous storage arrays.

FIG. 14 shows an embodiment of a general process 150 for migrating data between heterogeneous storage arrays 16-1, 16-2. In the description of the process 150, reference is also made to FIG. 13. The data mobility engine 140 running at the host 12-1 communicates with the source storage array 16-1 to acquire (step 152) metadata needed to accomplish the remote replication. Accordingly, within this context, metadata refers to name and address information about the source storage array 16-1, its ports, and its LUNs. More specifically, the data mobility engine 140 communicates with the name server database 30 to obtain the addresses (port IDs) of the ports of the source storage array 16-1. In addition, the data mobility engine 140 then communicates with the source storage array 16-1 to obtain the worldwide names of the ports and of the LUNs of the source storage array 16-1.

To obtain the needed metadata, in one embodiment the data mobility engine 140 issues a SCSI initialization command and a series of SCSI inquiry commands to login to the source storage array 16-1, determine the worldwide name of the storage array (e.g., with a VPD80 command), and obtain the number of LUNS in the source storage array 16-1 (e.g., with a VPD83 command). In this embodiment, the source storage array 16-1 is SCSI-compliant and responds to the SCSI inquiry commands to provide the requested information. Then, on a LUN-by-LUN basis, the data mobility engine 140 queries the source storage array 16-1 to identify the storage capacity of each LUN.

After acquiring this metadata, the data mobility engine 140 directs the switch to generate (step 154) an appropriately configured target array at the destination storage array 16-2 for receiving the data to be migrated from the source storage array 16-1. An appropriately configured target array includes as many LUNs as LUNs being migrated of the source storage array 16-1, each of such destination LUNs corresponding to and being of equal storage capacity to one of the source LUNs. The target array also has as many ports as the source array, with each of such ports corresponding to one of the ports of the source array. The target array can also have extra LUNs and/or ports, as described. Depending upon the particular data migration scenario, described below, the source array can be a virtual array or a full array, and the target array can be a virtual array or a full array (i.e., hosts access the LUNs of the target array using physical port addresses). With the target array prepared for receiving the source data, the data mobility engine 140 runs the remote replication logic to copy (step 156) data from the source array to the target array at the destination storage array 16-2.

To prepare for a transparent switchover to the destination storage array, the port names of the source storage array 16-1 replace (step 158) those of the destination storage array 16-2. Also, the LUN names and numbers extracted from the source storage array 16-1 replace (step 160) the LUN names and LUN numbers of the target array at the destination storage array. Translation tables 77 maintained by the destination storage array 16-2 identify the various name and number replacements.

The new port names, LUN names, and LUN numbers become enabled at step 162 (i.e., the destination storage array 16-2 activates its translation tables). The name server database 30 is then reinitialized (step 164) in response to a switchover trigger, described above, and uploaded (step 166) to the hosts 12. During the switch over, the source storage array 16-1 is rendered (step 168) "invisible" to hosts 12. One mechanism for accomplishing this is to issue a command directing to the source storage array 16-1 to disable its transmitters. Another technique is for the switch 14 to alter the zoning to prevent the hosts 12 from seeing the source storage array 16-1 should the data mobility engine 140 be unable to disable the source storage array 16-1 from being presented to the hosts 12. Other techniques may be employed without departing from the principles of the invention. The hosts 12 then queries (step 170) the destination storage array 16-2 for LUN names and LUN numbers and subsequently communicates with the destination storage array 16-2 without any indication that the hosts 12 are no longer communicating with the source storage array 16-1.

Figure 15A:
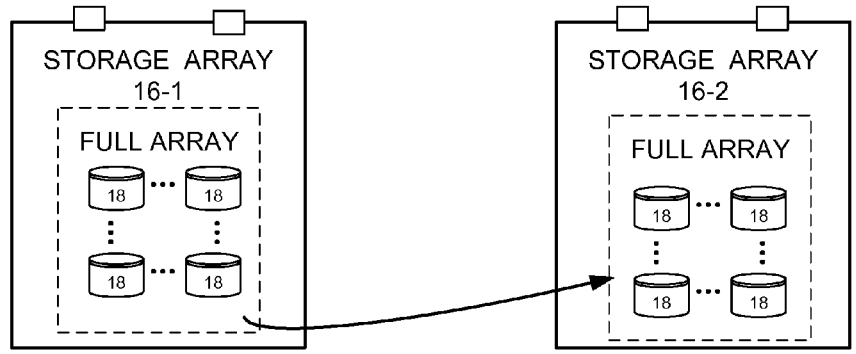
FIG. 15A, FIG. 15B, and FIG. 15C are block diagram representations illustrating different embodiments of source arrays and target arrays involved in the non-disruptive data migration.
Figure 15B:
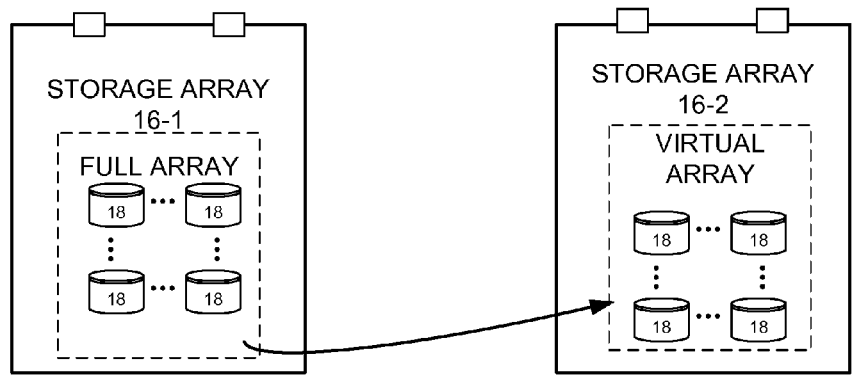
Figure 15C:
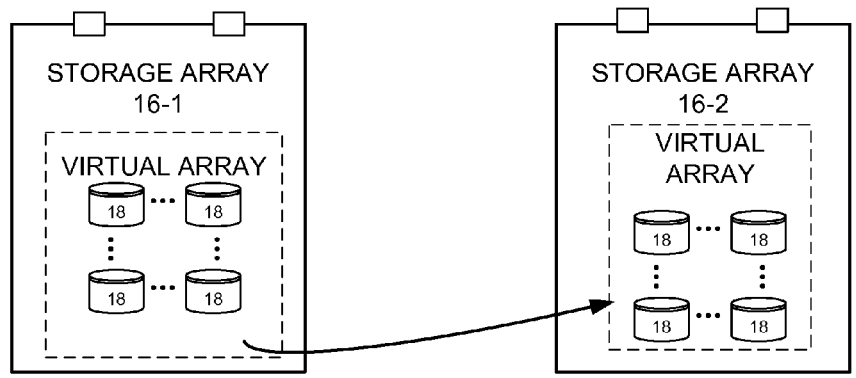

The process 150 for migrating data between heterogeneous storage arrays 16-1, 16-2 applies in a variety of data migration scenarios. FIG. 15A, FIG. 15B, and FIG. 15C provide simple illustrations of some of the various scenarios. FIG. 15A illustrates data migration from a source full array 16-1 to a destination full array 16-2. Techniques for implementing full array to full array data migration are described in is described in U.S. patent application Ser. No. 11/241,165, filed Sep. 30, 2005, titled "Full Array Non-Disruptive Data Migration," the entirety of which is incorporated by reference herein. FIG. 15B illustrates data migration from a source full array 16-1 to a destination virtual array 16-2 that spans one or more physical destination storage arrays, as described above. FIG. 15C illustrates data migration from a source virtual array to a destination virtual array. Techniques for implementing data migration between heterogeneous virtual arrays are similar to those described for migration between a full array and a virtual array.

Aspects of the present invention may be embodied in hardware, firmware, or software (i.e., program code). Program code may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented using hardware (digital or analog), firmware, software, or a combination thereof.

While the invention has been shown and described with reference to specific preferred embodiments, it should be understood by those skilled in the art that various changes in form and detail may be made therein without departing from the spirit and scope of the invention as defined by the following claims. For example, although described as running from a host, the data mobility engine 140 can execute from the host 12, from the switch 14, from the destination storage array 16-2, or from a combination thereof. As another example, although the invention has been described primarily with reference to Fibre Channel devices, arrays, switches, and ports, it is to be understood that the principles of the invention apply to other types of devices and transports for use with other types of storage protocols, (e.g., iSCSI (Internet Small Computer System Interface), AoE (ATA over Ethernet), and FCoE (Fibre Channel over Ethernet).

What is claimed is:

1. A method for non-disruptively migrating data from a source storage array to a destination storage array, the source and destination storage arrays being heterogeneous, wherein heterogeneous storage arrays are different enough from each other to preclude direct communication with each other in order to coordinate and conduct data migration therebetween, the method comprising:

querying a name server database, used by hosts to learn name and address associations of devices, to obtain port names for each source port of the source storage array;

communicating with the source storage array to obtain information about the source storage array and about each logical unit of storage (LUN) of the source storage array;

generating a target array at the destination storage array for receiving a copy of data resident at the source storage array, the target array having at least as many ports as physical source ports of the source storage array and at least as many LUNs as LUNs of the source storage array, each LUN of the source storage array corresponding to one of the LUNs of the target array and being equal in storage capacity as that corresponding LUN;

copying all data resident in the LUNs of the source storage array to corresponding LUNs in the target array; and inducing the name server database to reconfigure so as to associate port names of the physical source ports of the source storage array with port addresses of the ports of the target array such that the target array appears to a host as the source storage array.

2. The method of claim 1, wherein the step of communicating with the source storage array includes issuing SCSI inquiry commands to the source storage array to learn of the source storage array and LUN information.

3. The method of claim 1, further comprising the step of altering zoning after switchover such that hosts cannot communicate with the source storage array.

4. The method of claim 1, wherein the target array is a virtual array spanning at least one physical destination storage array and the ports of the target array are virtual ports, each virtual port having a virtual port address.

5. The method of claim 1, wherein the ports of the target array are physical ports.

6. The method of claim 1, wherein the step of copying is initiated by logic executing at a host.

7. The method of claim 1, wherein the step of copying is initiated by logic executing at a switch in communication with the source and destination storage arrays.

8. The method of claim 1, wherein the step of copying is initiated by logic executing at the destination storage array.

9. The method of claim 1, further comprising rendering the source storage array invisible to hosts after copying all data resident on the source storage array to the target array and switching over to the target array.

10. A storage area network comprising:
a switch;
a name server database that associates names and addresses of ports coupled to the switch, the name server database being accessible to one or more hosts for learning name and address associations;
a source storage array having one or more source ports coupled to port address;
a destination storage array having a target array for receiving a copy of all data resident at the source storage array, the source and destination storage arrays being heterogeneous, wherein heterogeneous storage arrays are different enough from each other to preclude direct communication with each other in order to coordinate and conduct data migration therebetween, the target array of the destination storage array being configured with at least as many ports as physical source ports of the source storage array and with at least as many logical units of storage (LUNs) as LUNs of the source storage array, each LUN of the source storage array corresponding to one of the LUNs of the target array and being equal in storage capacity as that corresponding LUN, each port of the target array having a port name and port address;
logic copying all data resident in the LUNs of the source storage array to corresponding LUNs in the target array; and
logic inducing reconfiguration of the name server database to associate port names of the physical source ports of the source storage array with the port addresses of the ports of the target array such that the target array appears to a host as the source storage array.

11. The storage area network of claim 10, wherein the logic communicating with the source storage array includes logic issuing SCSI inquiry commands to the source storage array to learn of the source storage array and LUN information.

12. The storage area network of claim 10, further comprising logic altering zoning after switchover such that hosts cannot communicate with the source storage array.

13. The storage area network of claim 10, wherein the target array is a virtual array spanning at least one physical destination storage array and the ports of the target array are virtual ports, each virtual port having a virtual port address.

14. The storage area network of claim 10, wherein the ports of the target array are physical ports.

15. The storage area network of claim 10, wherein the logic copying all data is initiated by logic executing at a host.

16. The storage area network of claim 10, wherein the logic copying all data is initiated by logic executing at a switch in communication with the source and destination storage arrays.

17. The storage area network of claim 10, wherein the logic copying all data is initiated by logic executing at the destination storage array.

18. The storage area network of claim 10, wherein the source storage array is rendered invisible to hosts after all data resident on the source storage array is copied to the target array and switchover occurs to the target array.

19. A computer program product comprising:
a non-transitory computer-useable medium having a computer-readable program code embodied in said medium for non-disruptively migrating data in a storage area network from a source storage array to one or more destination storage arrays, the source storage array being heterogeneous with respect to the one or more destination storage arrays, wherein heterogeneous storage arrays are different enough from each other to preclude direct communication with each other in order to coordinate and conduct data migration therebetween, the computer readable program code in said medium comprising:
computer-readable program code for causing the storage area network to query a name server database, used by hosts to learn name and address associations of devices, to obtain port names for each source port of the source storage array;
computer-readable program code for causing the storage area network to communicate with the source storage array to obtain information about the source storage array and about each logical unit of storage (LUN) of the source storage array;
computer-readable program code for causing the storage area network to generate a target array at the destination storage array for receiving a copy of data resident at the source storage array, the target array having at least as many ports as physical source ports of the source storage array and at least as many LUNs as LUNs of the source storage array, each LUN of the source storage array corresponding to one of the LUNs of the target array and being equal in storage capacity as that corresponding LUN;
computer-readable program code for causing the storage area network to copy all data resident in the LUNs of the source storage array to corresponding LUNs in the target array; and
computer-readable program code for causing the storage area network to reconfigure the name server database to associate port names of the physical source ports of the source storage array with port addresses of the ports of the target array such that the target array appears to a host as the source storage array.

20. The computer program product of claim 19, wherein the computer-readable program code for causing the storage area network to communicate with the source storage array includes computer-readable program code for causing the storage area network to issue SCSI inquiry commands to the source storage array to learn of the source storage array and LUN information.

21. The computer program product of claim 19, further comprising computer-readable program code for causing the storage area network to alter zoning after switchover such that hosts cannot communicate with the source storage array.

22. The computer program product of claim 19, wherein the target array is a virtual array spanning at least one physical destination storage array and the ports of the target array are virtual ports, each virtual port having a virtual port address.

23. The computer program product of claim 19, wherein the ports of the target array are physical ports.

24. The computer program product of claim 19, wherein the computer-readable program code for causing the storage area network to copy is initiated by computer-readable program code executing at a host.

25. The computer program product of claim 19, wherein the computer-readable program code for causing the storage area network to copy is initiated by the computer-readable program code executing at a switch in communication with the source and destination storage arrays.

26. The computer program product of claim 19, wherein the computer-readable program code for causing the storage area network to copy is initiated by the computer-readable program code executing at the destination storage array.

27. The computer program product of claim 19, further comprising computer-readable program code for rendering the source storage array invisible to hosts after all data resident on the source storage array is copied to the target array and switchover occurs to the target array.

* * * * *